S. C. COX.
ADDRESSING MACHINE.
APPLICATION FILED JUNE 23, 1906.
1,105,322.
Patented July 28, 1914.
12 SHEETS—SHEET 1.
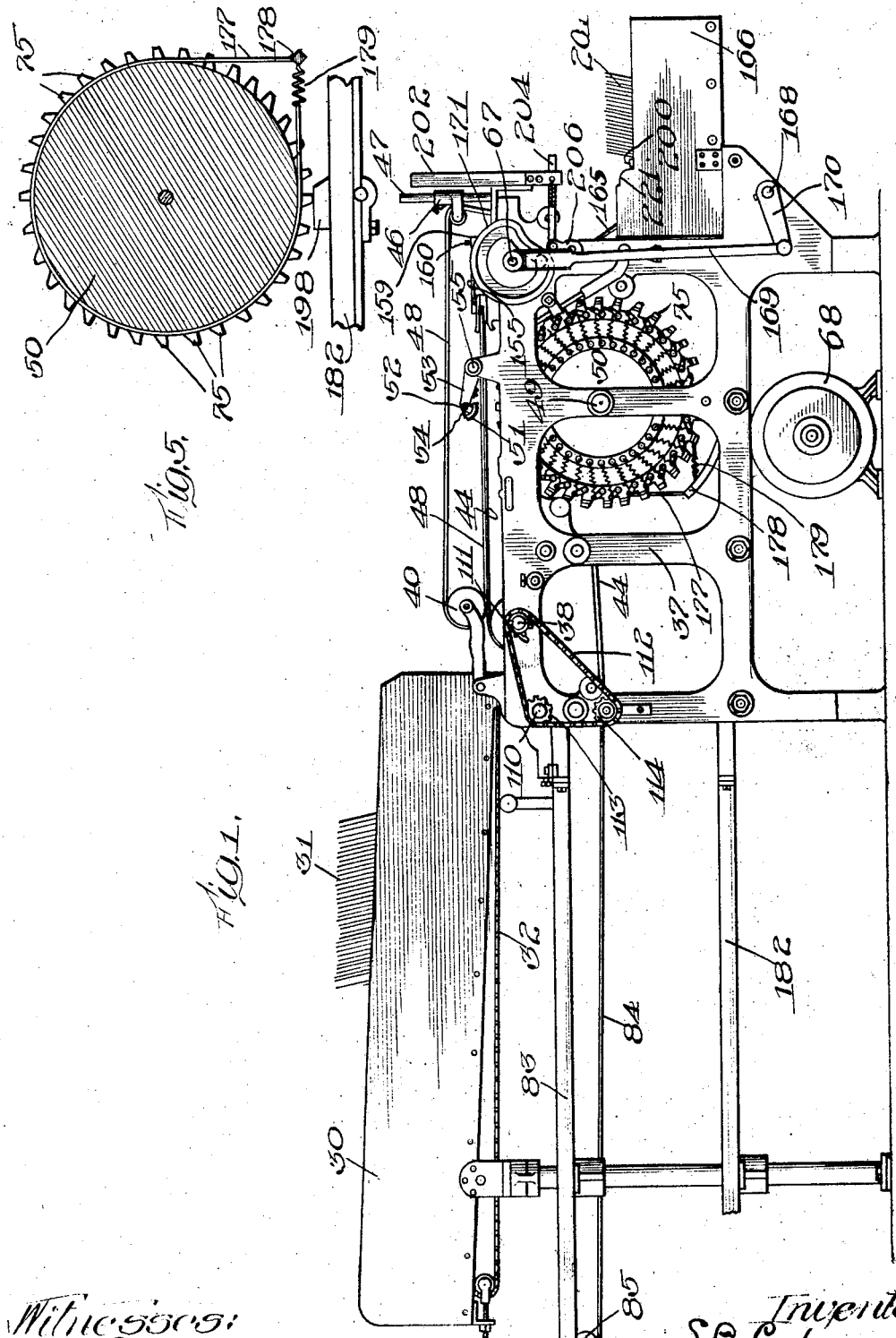

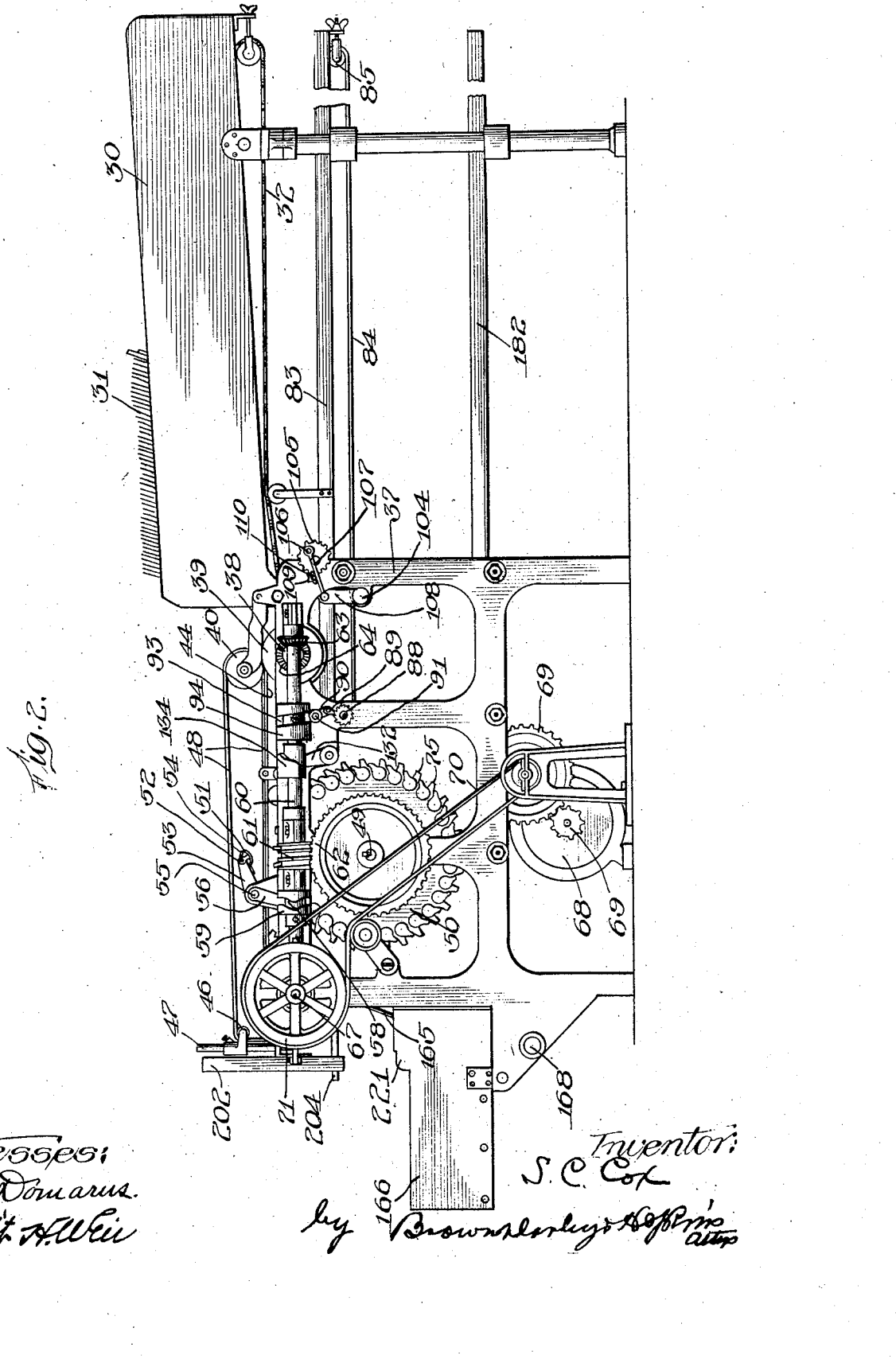

S. C. COX.
ADDRESSING MACHINE.
APPLICATION FILED JUNE 23, 1906.
1,105,322.
Patented July 28, 1914.
12 SHEETS—SHEET 3.
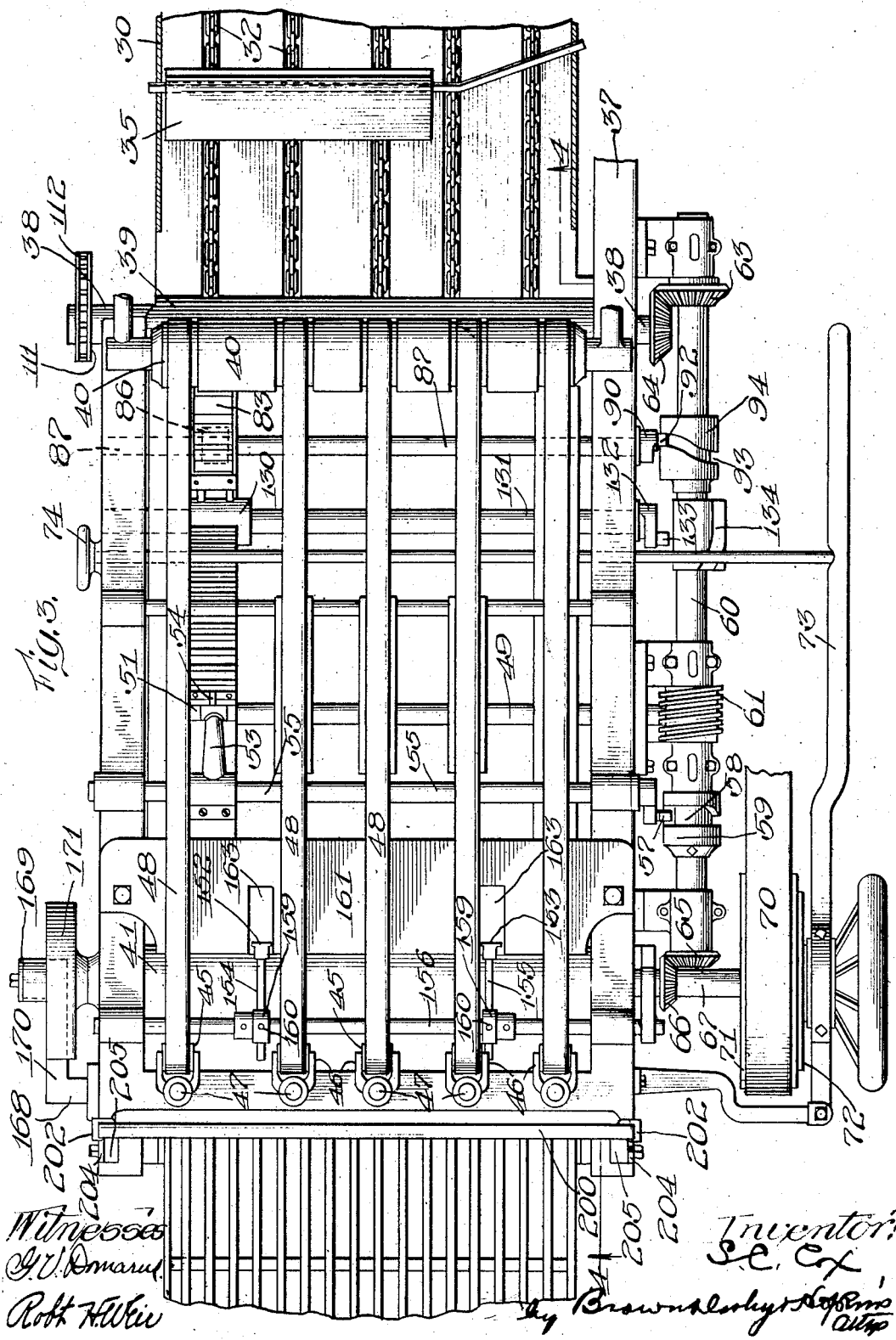

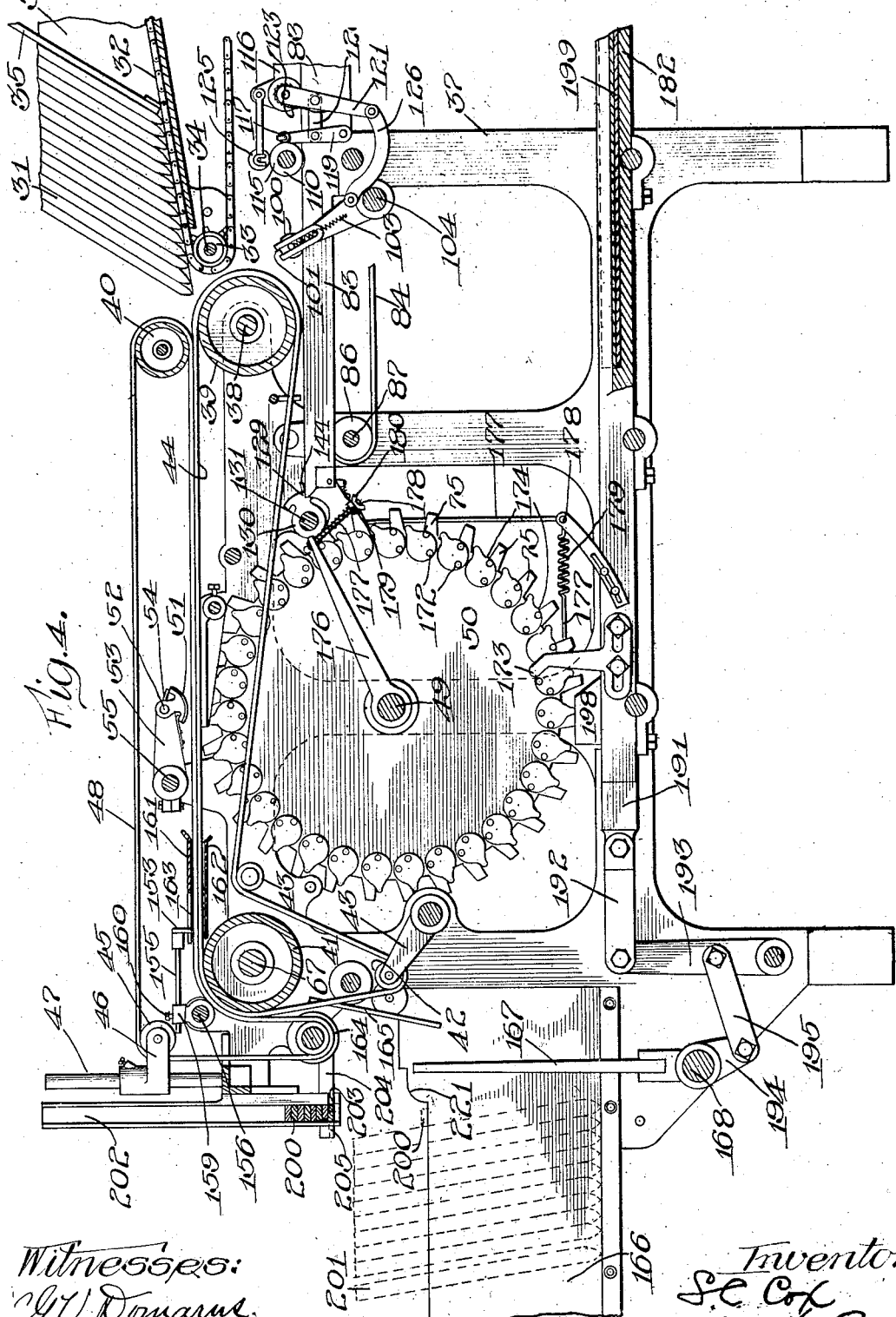

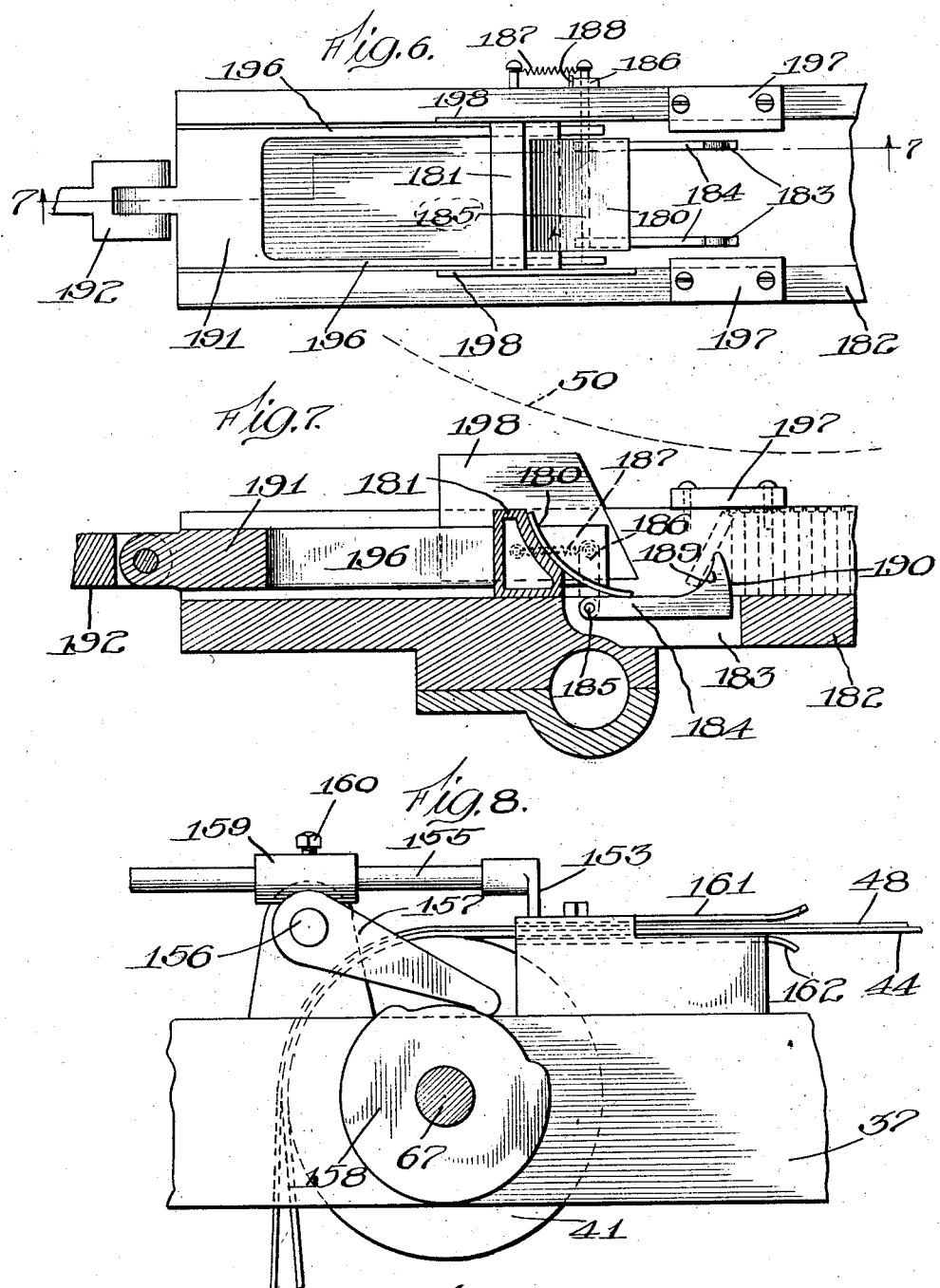

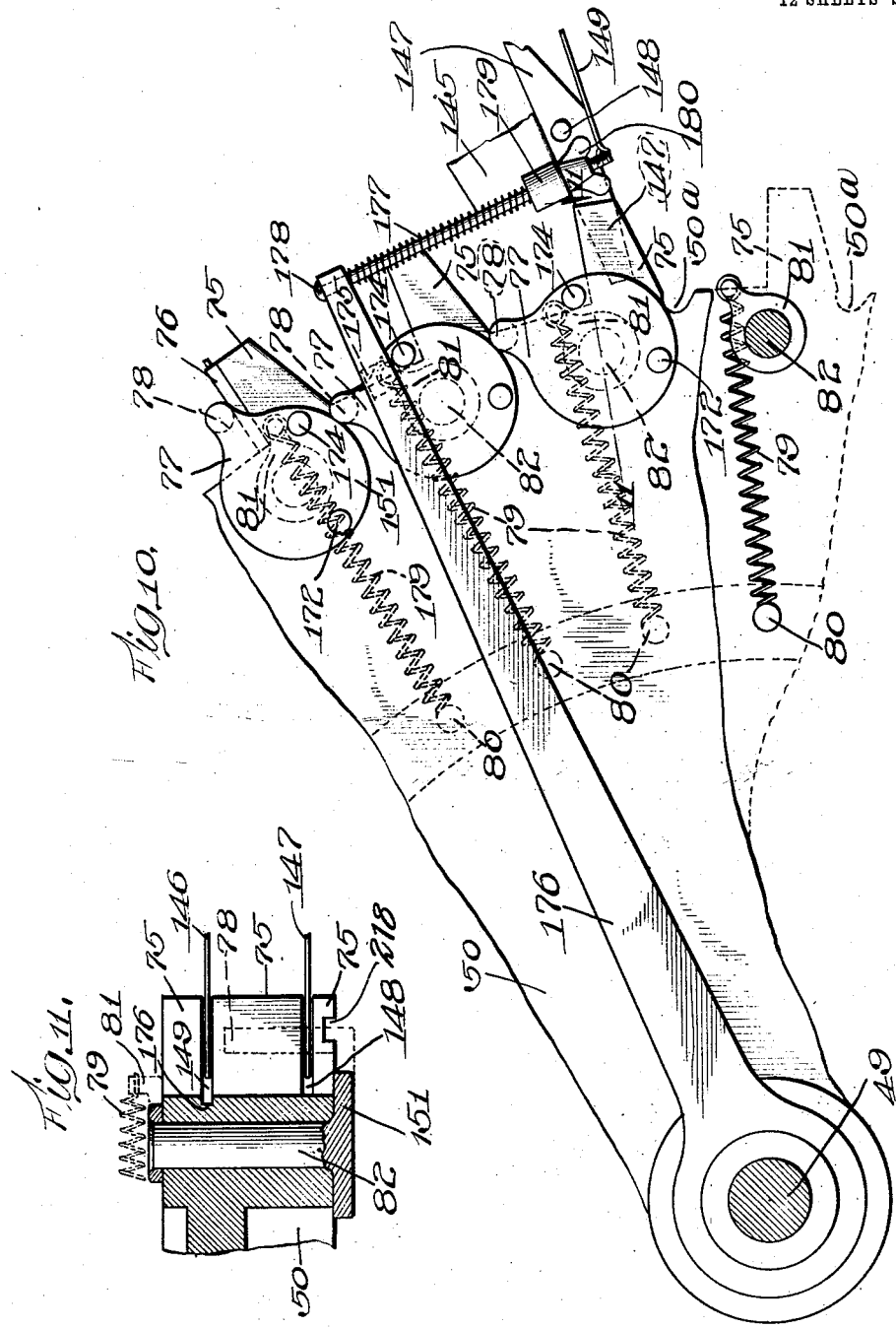

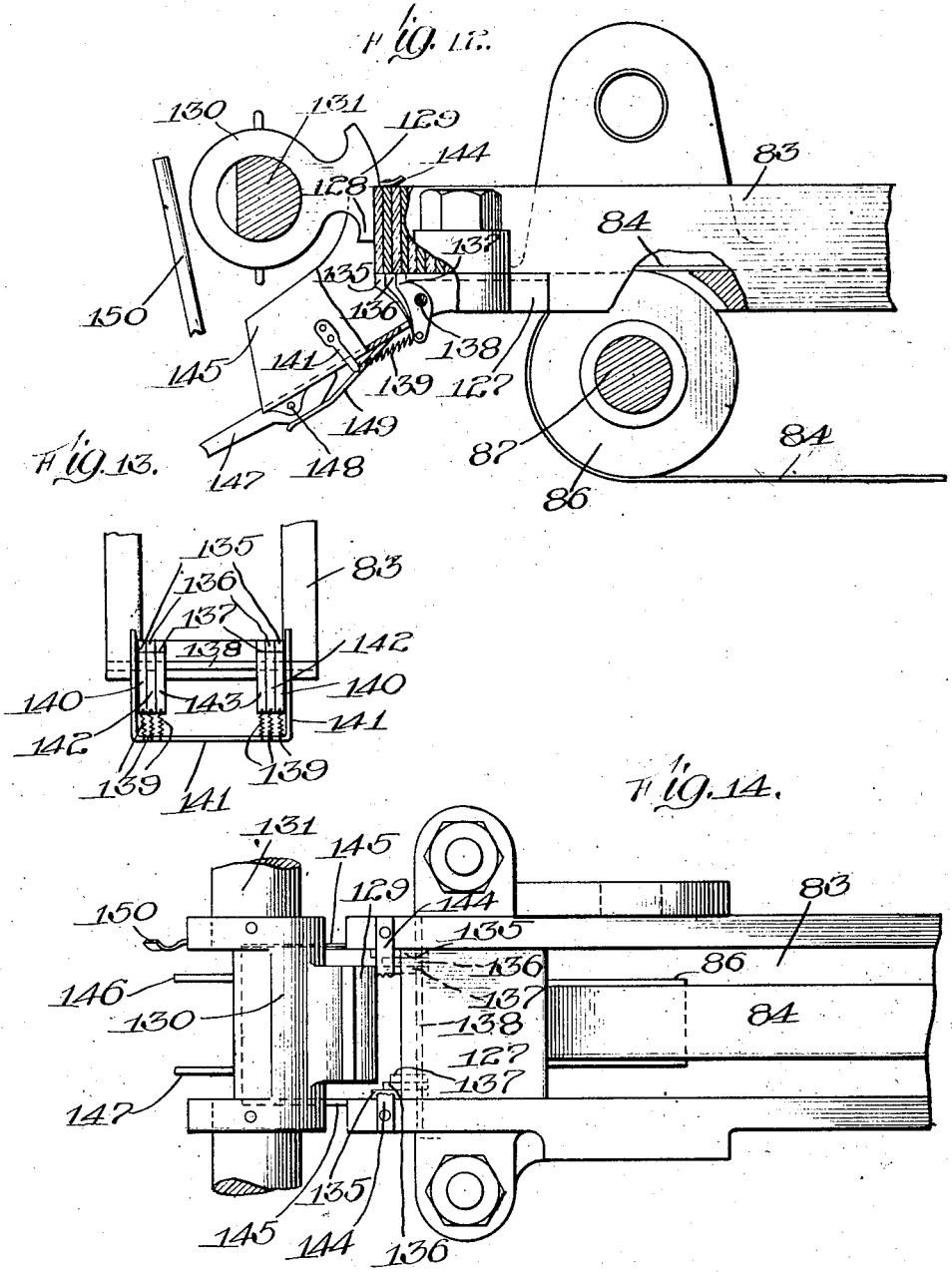

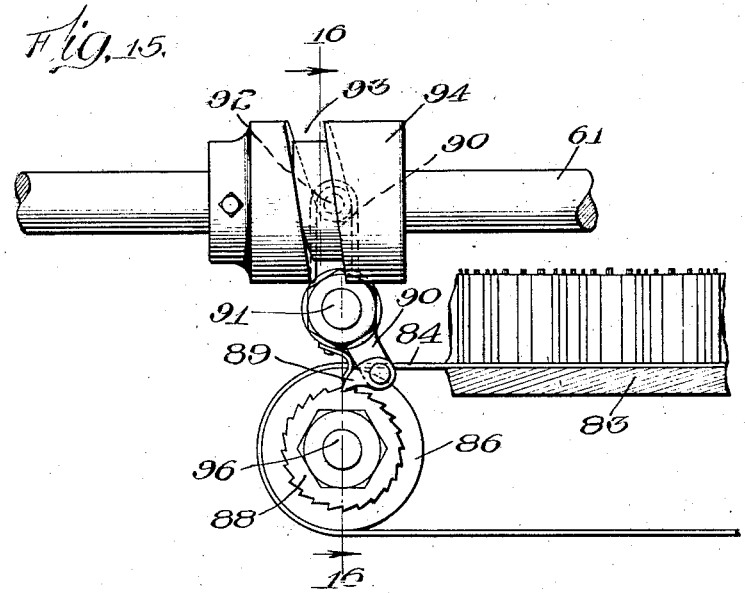
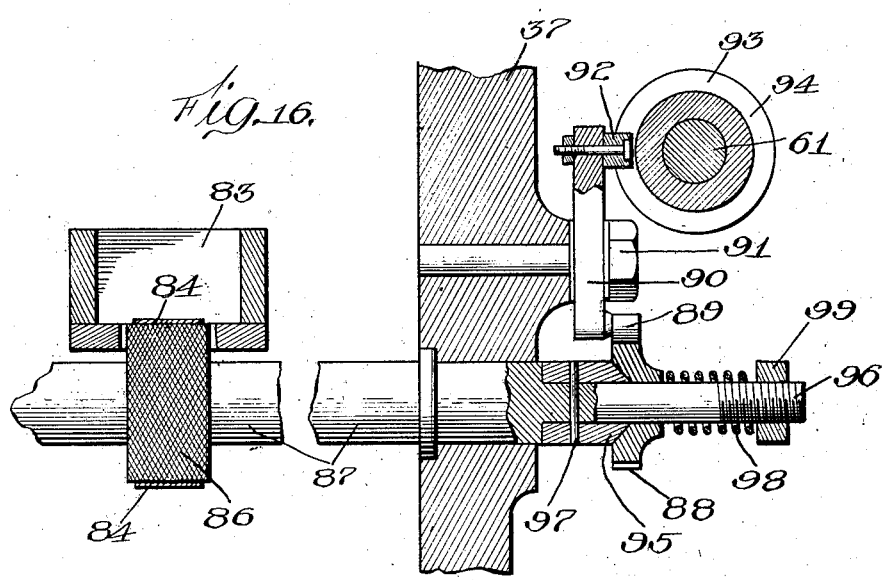

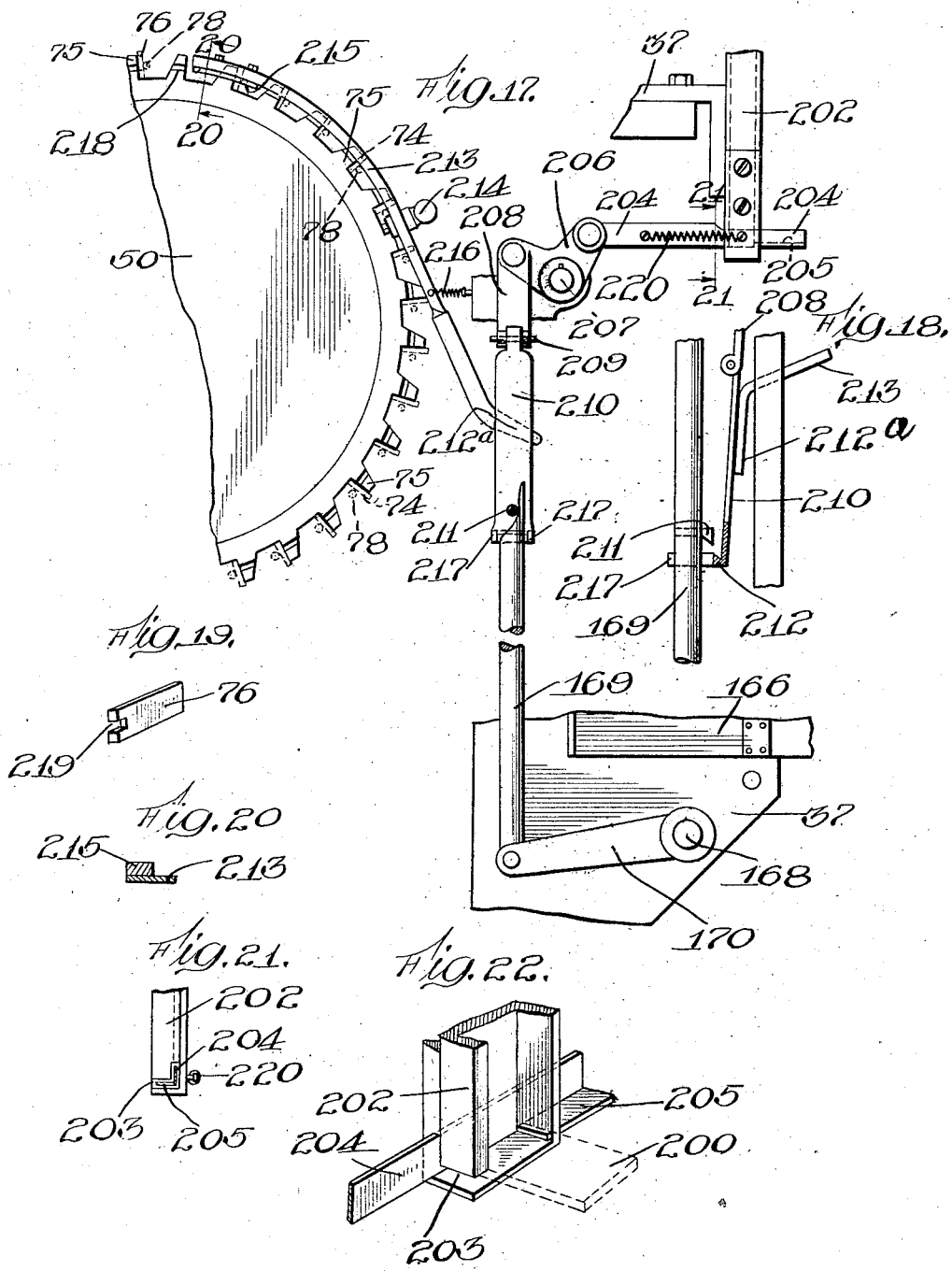

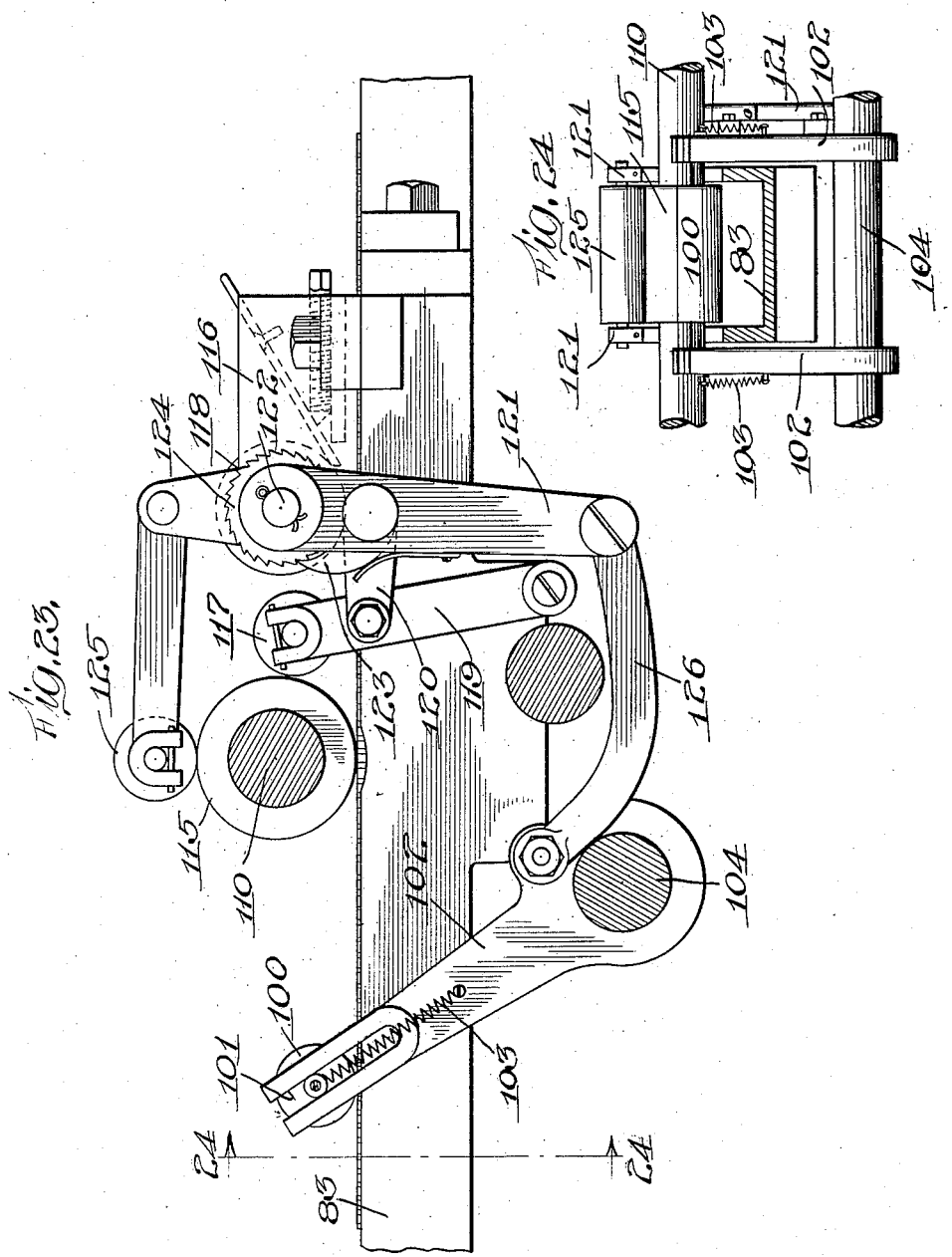

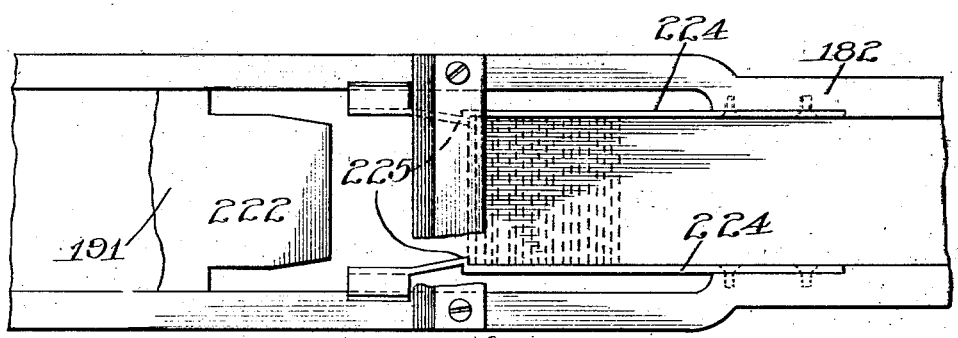
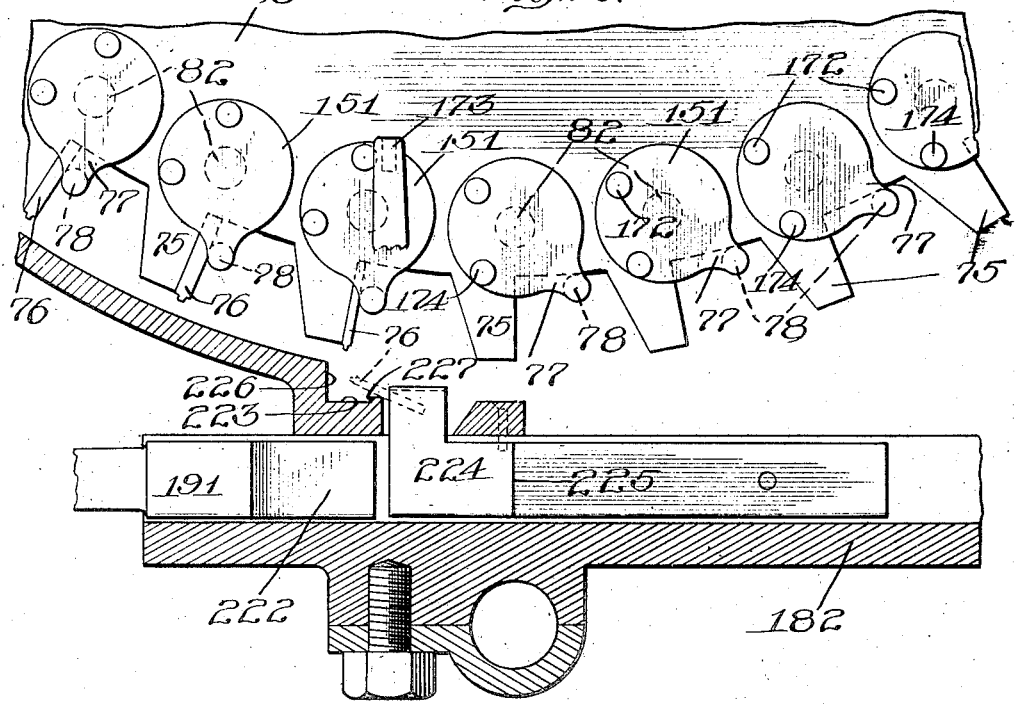

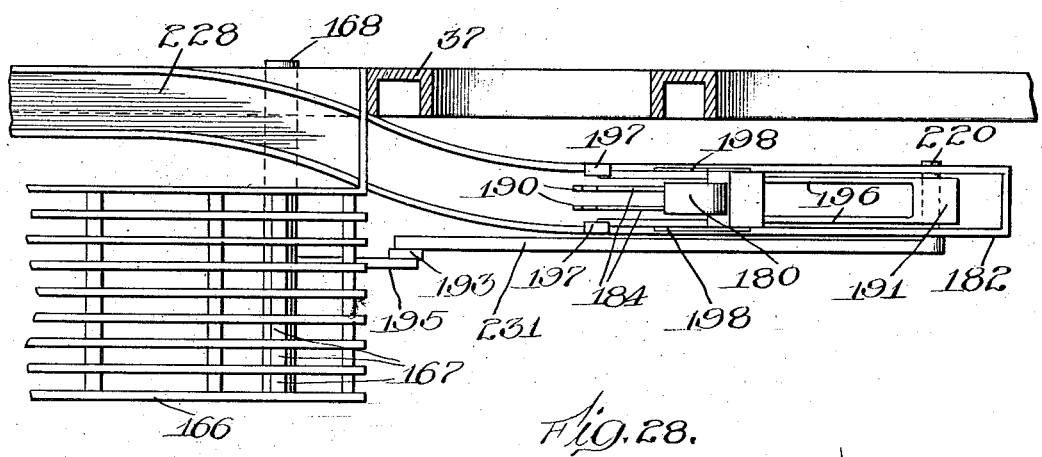
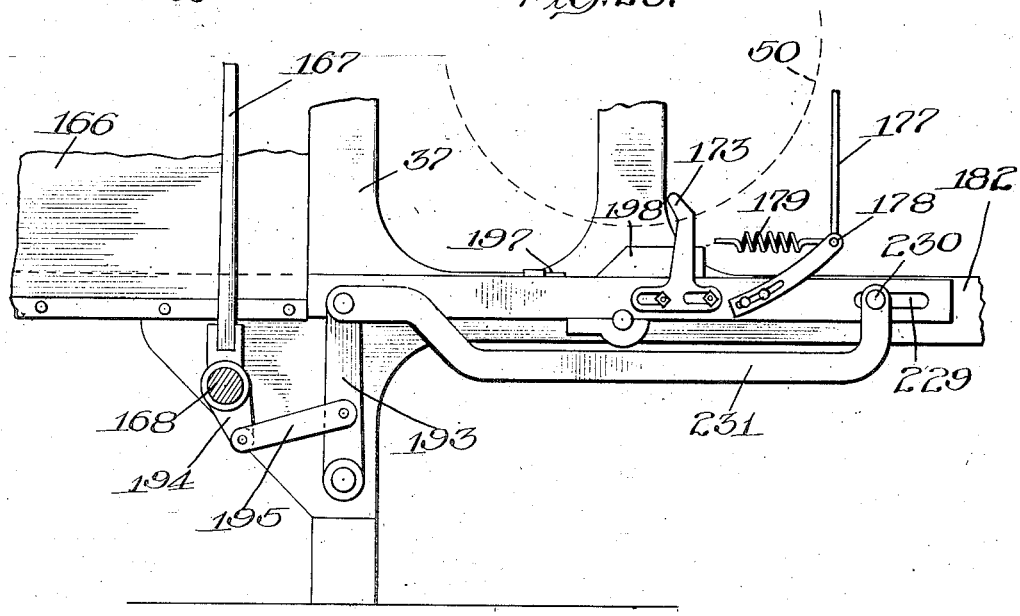

UNITED STATES PATENT OFFICE.

SANDFORD C. COX, OF EDISON PARK, ILLINOIS, ASSIGNOR TO COX MULTI-MAILER COMPANY, OF AUGUSTA, MAINE, A CORPORATION OF MAINE.

ADDRESSING-MACHINE.

1,105,322. Specification of Letters Patent. Patented July 28, 1914.

Original application filed February 29, 1904, Serial No. 195,869. Divided and this application filed June 23, 1906. Serial No. 323,015.

*To all whom it may concern:*

Be it known that I, SANDFORD C. Cox, a citizen of the United States, residing at Edison Park, in the county of Cook and State of Illinois, have invented certain new and useful Improvements in Addressing - Machines, of which the following is a full, clear, and exact specification.

This invention relates more particularly to means for addressing newspapers and similar articles by printing or otherwise applying the addresses to the paper before it is rolled or placed in the wrapper, and the primary object is to provide simple and efficient automatic mechanisms for thus applying the addresses to the papers either as they come directly from the press or folding machine, or as they are fed from a special feed box to the addressing machine.

A further object is to automatically collect the printed or addressed papers in a compact and orderly form ready for shipment or mailing, and to automatically deposit markers at certain intervals between the papers so that the papers which go to one town may be readily distinguished from those which go to another town, or the papers may be separated into batches for any other desired purpose.

A further object is to automatically collect the slugs or lines of types after they have been utilized for printing the addresses, in a suitable order of arrangement for further use without individual handling.

To the attainment of these ends and the accomplishment of other new and useful objects as will appear, the invention consists in the features or novelty in the construction, combination and arrangement of the several parts hereinafter more fully described and claimed and shown in the accompanying drawing illustrating an exemplification of the invention, and in which;—

Figure 1 is a side elevation of an addressing machine embodying this invention. Fig. 2 is a side elevation of the opposite side presented in Fig. 1. Fig. 3 is an enlarged plan view, partly broken away. Fig. 4 is a vertical longitudinal section taken on line 4—4 of Fig. 3. Fig. 5 is a detail vertical sectional view of the slug carrier or wheel, taken crosswise of its axis. Fig. 6 is a detail plan view of the receiving galley and mechanism. Fig. 7 is a vertical longitudinal section on line 7—7 of Fig. 6. Fig. 8 is an enlarged detail vertical sectional view of the gages or stops which position the paper, and the cam which actuates the same. Fig. 9 is a detail cross sectional view of one end of the receiving galley. Fig. 10 is an elevation of the slug carrying wheel partly in vertical section, also showing the arm which carries one of the trips hereinafter described. Fig. 11 is an enlarged detail sectional view of the edge of the slug carrying wheel taken on line 11—11 of Fig. 10. Fig. 12 is an enlarged side elevation of one end of the type galley or race and the ejecting finger with connected parts partially broken away and in vertical section. Fig. 13 is a detail end elevation of the slug supports or retaining means at the end of the race or galley. Fig. 14 is a plan view of the mechanism shown in Fig. 12 partly broken away. Fig. 15 is a detail side elevation of the mechanism for advancing the slugs or types in the slug feeding galley or race, the latter being shown in vertical section. Fig. 16 is a vertical sectional view on line 16—16 of Fig. 15, a portion of the operating shaft being broken away. Fig. 17 is a side elevation, partly broken away, of the trip mechanism and connected parts for actuating the marker ejectors. Fig. 18 is a detail view of a portion thereof, looking from the right of Fig. 17. Fig. 19 is a perspective view of one of the grooved slugs. Fig. 20 is a sectional view on line 20—20 of Fig. 17. Fig. 21 is a sectional view on line 21—21 of Fig. 17. Fig. 22 is a detail view of one of the marker ejectors. Fig. 23 is an enlarged side elevation of the inking mechanism. Fig. 24 is a sectional view on line 24—24 of Fig. 23. Fig. 25 is a plan view of a modified form of a slug receiving galley and mechanism. Fig. 26 is a vertical longitudinal section thereof. Fig. 27 is a top plan view of a modified form of an arrangement of the galley. Fig. 28 is an enlarged detail view of the trip mechanism for the type jaws and the connecting link between the said mechanism and the rock shaft of the packer fingers.

In the drawings the same reference numerals designate similar parts throughout the several views.

A specific feeding mechanism for supplying the papers to this machine is shown in my original application filed February 29, 1904, Serial Number 195,869, this being a divisional application thereof.

In the operation of this machine the papers to be addressed are preferably folded one or more times and placed in a hopper or feed trough, from which they are gradually fed by a follower board to the outlet end of such hopper, the operation of which is more specifically set forth in the original application referred to. From the hopper the papers are fed between endless belts or tapes and each is arrested by suitable stops or gages which position it with relation to a trip or slug holder, while a stamper or platen impresses the paper against the type surface. After being stamped or marked the tapes or belts continue the travel of the paper to a suitable receiver where the papers are deposited on edge in regular order and suitable markers are inserted between the papers where desired for separating one batch of papers from another by automatic mechanism working in harmony with the printing mechanism.

The slugs bearing the addresses are contained in a race or galley which is provided with means for yieldingly urging the slugs forward to the end of the galley, where they are taken off one at a time and deposited in the slug holder or wheel, and after they are printed from they are automatically ejected from the slug holder or wheel into a receiving galley, which stores them in their regular order. A suitable inclined hopper or feed trough 30 having an open front end is provided for the papers 31. The bottom of the hopper is provided with a number of belts 32, preferably composed of chains, which run over suitable idlers 33, on a shaft 34, one only of which is shown. A suitable follower 35 is removably connected to the chains or belts 32 and advances to push the papers forward when the chains are moved, motion being transmitted to the chains by means of the shaft 34, which is rotated in any desired manner preferably in the manner set forth in the original application. This trough is supported in any suitable manner with its open or discharge end above and adjacent a frame 37 of any desired construction and which supports the remaining mechanism or parts of the machine. Journaled in the frame 37, adjacent the outlet or discharge end of the trough 30, and in suitable bearings (not shown) is a shaft 38 which supports and rotates a roller 39. This roller projects sufficiently under the end of the trough 30 to receive the papers 31 as they are pushed forward by the follower 35, so as to cause the papers to pass between the roller 39 and a suitable roller 40 mounted above, in close proximity to and parallel with the roller 39, but with its axis farther along the line of movement of the paper than the axis of the roller 39. This arrangement insures the entrance of the paper between the rollers and avoids the possibility of the paper being pushed down without entering between the rollers. In the end of the frame opposite and parallel with the roller 39 is mounted a roller 41 and below this roller is a tightener roller 42 mounted upon a suitable arm 43, and passing over these rollers 39—41—42 and a suitable guide roller 43, are a plurality of tapes or belts 44. Arranged opposite and parallel with the roller 40 is an idler 45 which may be mounted in brackets 46 adjustably secured to standards 47 so that the roller 45 will also act as a tightener, and passing over the rollers 40—45 are a number of tapes or belts 48 which run parallel with and preferably on top of the tapes or belts 44, so that the lower run of the belts 48 rest upon the upper runs of the lower belts 44, and serve to begin to convey the paper horizontally from the supply in the hopper as soon as the lower edge enters between the rollers 39—40, and thus conduct them to the means for printing or applying the addresses thereto, which will now be described.

Secured to and mounted on a horizontal shaft 49 is a wheel or drum 50 which constitutes a holder for securing the slugs or lines of type and carrying the same into position for impression against the paper as the latter is held between the tapes or belts 44—48, the wheel or drum being adapted to hold a large number of slugs at once, but to print from them one at a time, the uppermost one, when it arrives at the position indicated in Fig. 1, being the one which is printed from and when in this position it is just below the upper run of the lower tapes or belts 44 and the lower run of the upper tapes or belts 48, and when in this position is directly under a stamper or impression device which forces the paper downwardly into contact with the previously inclined surface of the type or slug, it being understood that the tapes or belts 44—48 pass to either side of the drum or wheel 50. This stamper or impression device consists of a shoe 51 pivoted at 52 to a rocker arm 53 and having its lower engaging surface curved preferably on the arc which it describes around the center 52, so that if necessary, the shoe will move in the direction of rotation of the wheel 50 while pressing the paper against the type and without blurring the printing, and to the end that the shoe 51 may return to its normal position after it releases the paper, such rotating action being produced by the frictional contact of the paper therewith, a spring 54 is provided for pressing the shoe in a direction opposite that in which the paper moves. This rocker arm 53 derives its oscillating movement at the proper time from a shaft 55 on which it is mounted and which shaft is also provided with a crank 56 having a crank pin 57 (see Figs. 2 and 3) engaging in a cam groove 58 of a cam 59 which is so formed as to oscillate the crank 56 when the paper arrives over the slug carrier 50 and the slug is in the proper position, and to hold the arm stationary with the shoe 51 elevated at other times.

The cam 59 is mounted on a horizontal shaft 60 which serves for driving the shaft 49 at a low rate of speed, but continuously, through the intermediary of a worm 61 on the shaft 60 and a worm gear 62 on the shaft 49, and this shaft 60 also serves for driving the shaft 38 through the intermediary of miter gears 63—64, secured to the shafts 60—38 respectively. The shaft 60 is itself driven by miter-gears 65—66 on shaft 60 and a main driving shaft 67 respectively, the latter shaft also serving as a means for driving the belt or tape roller 41.

If desired, the shaft 67 may be driven from any suitable source of power, such as an electric motor 68 (see Fig. 2), through the intermediary of gears 69 and belt 70, which runs over a pulley 71 constituting a part of a suitable clutch whose other member is indicated at 72 (Fig. 3), and is under the control of a shift lever 73, provided also with a handle 74 on the opposite side of the machine. The shaft 67 therefore only rotates when the clutch members 71—72 are in engagement, as will be understood. The slug or type carrier is preferably in the form of a drum or wheel provided around its circumference at short intervals with a plurality of slug seats in the form of radial teeth 75, one side or face of each of which is preferably radial with respect to the center of the drum, so that the slug 76 may rest flat against the same, as shown in Figs. 10 and 26, with the outer edge or printing surface just above or beyond the outer end of the tooth in such a position that downward pressure against the printing surface when the slug arrives at the highest point of its travel and directly under the stamper 51 will be exerted lengthwise in the vertical axis of the slug and the radius of the drum and hence will not tend to unseat the slug. Pivoted to one side of the drum adjacent to each of the teeth 75 is a rocker arm 77 which carries a pin 78 extending transversely of the periphery of the drum and across the radial face of the tooth so as to be capable of pressing the other face of the slug and holding the latter singly against the tooth while the slug is being conveyed to and from printing position hence this pin 78 and the tooth 75 constitute a clamp, the movable jaw of which is the pin and which is held in contact with the slug when once thrown thereagainst, by any suitable means such as a spring 79, one end of which is secured to the drum by a fixture 80 and the other to a crank arm 81 on the opposite side of the drum to that on which the arm 77 is located, both of these arms 77 and 81 being rigidly secured to a rocker shaft 82 (Fig. 10), journaled in the drum or wheel 50, and the two arms 77 and 81 are so positioned relatively to each other that when the jaw or pin 78 is thrown over against the slug the longitudinal axis of the spring 79 will be on that side of the center of the shaft 82 next the tooth or jaw 75 as shown at the top of Fig. 10, and when thrown out of engagement with the slug as shown at the bottom position in Fig. 10, the longitudinal axis of the spring 79 will be on the other side of said center, and consequently the spring acts to hold the jaws closed when once closed and open when once opened, and at the same time the action of the movable jaw 78 is so elastic as to be able to hold the slugs or lines of types of various thicknesses with adequate pressure.

The means for automatically depositing the slugs one at a time into the jaws of the slug carrier or wheel and for opening and closing said jaws in proper time will now be described.

The slugs are arranged in the order in which the papers are to be addressed and mailed in a race or galley 83 which may be conveniently arranged in a horizontal position below the hopper or trough 30 and may be of any desired length, and in the bottom of this race or galley is laid the upper run of a band or belt 84, which runs over suitable pulleys 85—86 and constitutes the direct support for the slugs, as better shown in Fig. 15, so that when the band or belt 84 is driven the slugs will be urged forward in their race or galley with a degree of force adequate for keeping them fully advanced to the end of the galley but at the same time allowing the slugs to yield or come to rest while waiting the action of the devices provided for removing them one at a time preparatory to depositing them in the slug wheel or carrier, as will be presently described. This is an important feature of the invention, inasmuch as it will be understood that even though it were possible to provide positive means that would be so accurately timed and proportioned as to feed the slugs forward the distance of one slug at each operation of the printing mechanism, the small accumulation of printer's ink and dirt on the sides of the slugs would in the aggregate amount to such a difference in the total length of the entire supply as to render such positive feed mechanism entirely out of time with the movement of the slugs and the rest of the machine; moreover, it is not feasible to have the slugs of the same width because in some names and addresses only one line is required, while others require a plurality of lines; again, even though slugs that are intended to be of the same number of lines and thickness and cast in the same mold will nevertheless vary a slight fraction of an inch in thickness, and this fraction multiplied throughout the entire length of supply of slugs is sufficiently large in the aggregate to render positive operating mechanism inadequate. In order that the band or belt 84 may be thus moved continuously the pulley 86 is driven by any suitable connection with the driving mechanism of the machine. For example, it is mounted rigidly upon a shaft 87 upon which is also loosely mounted a ratchet 88 (Figs. 15 and 16), and the ratchet is operated intermittently by a pawl 89 pivoted to the lower end of a lever 90, which latter is pivoted on a support 91, to the side of the machine frame, or any other suitable place, while the upper end of lever 90 carries a stud or projection 92 which engages in a cam groove 93 formed in a cam 94 mounted on the shaft 61: but in addition to the yielding character of the described means for urging the slugs forward in the race or galley due to the slipping of the belt or band 84 under the slugs, it is preferable to also provide some slipping connection at the point between the pulley 86 and the driving cam 94, and to that end the ratchet 88 is connected to the shaft by a means similar to the cone friction clutch, constituted by providing the outer end of the shaft with a cone 95 which is secured to a reduced end 96 of the shaft 87, by a pin 97, and which cone fits in a complementary recess in the inner face of the ratchet 88. which latter is loose on the reduced end 96 but held in frictional contact with cone 95 by a spring 98, which is susceptible of adjustment by a nut 99 threaded upon the end 96. This provides a further safeguard against injury to the apparatus and undue compression of the slugs in the galley 83 in the event the frictional contact or weight of the slugs on the belt 84 should be so great as to cause these objectionable results.

As the slugs move along the galley 83, they are automatically inked by an inking roller 100 mounted in slots 101 in rocker arms 102 and held against the type surfaces by springs 103. Rocker arms 102 are mounted upon a rocker shaft 104. Shaft 104 derives its oscillation from a gear wheel 105 (Fig. 2) journaled on the outer side of the frame of the machine and having a crank pin 106 connected by a link 107 with a rocker arm 108 on the outer end of the shaft 104, and gear 105 receives a slow rotation from a small pinion 109 mounted on the end of shaft 110 which receives motion from the shaft 38 through the intermediary of a sprocket 111 secured to the shaft 38, and a chain belt or other suitable connection 112 running over a sprocket 113 on the shaft 110 and thence around a tightener 114.

The roller 100 receives ink from a roller 115 mounted on the shaft 110 and this is supplied with ink from any suitable ink fountain 116 by a roller 117 vibrating between the roller 115 and an ink feed roller 118. The roller 117 is thus vibrated by one or more arms 119 connected by a link 120 with a lever 121 pivoted on the journal 122 of the roller 118 and having a pawl 123 engaging the ratchet 124 for rotating the roller 118. The upper end of the lever 121 operates a distributing roller 125 and the lower end is connected by a link 126 to arm 102, whereby lever 121 receives oscillation, but any other suitable inking mechanism may be employed.

As shown more clearly in Figs. 12 to 14, the end of the galley 83 is provided with an extension 127 beyond the point where the belt 84 descends around the pulley 86, and on this extension 127, the slugs are urged by the action of the belt preparatory to being ejected and deposited in the slug holder or drum, and when they reach the outer extremity of this extension 127 their further longitudinal travel is positively resisted by a stop or lip 128 which accurately positions the slugs under a shoulder 129 of an ejector 130, which is mounted on a rocker shaft 131 extending across the machine and provided at its outer end with a crank arm 132 supplied with a crank pin 133 (see Figs. 2 and 3) arranged to be engaged by a revolving cam 134 on the shaft 61 at each revolution of the shaft, and thereby impart a downward stroke to the ejector which is returned to its former elevated position, in any suitable manner, as soon as the cam 134 passes the crank pin 133. The end slug is sustained or supported in position under the ejecting shoulder or plunger 129 until this downward movement of the ejector occurs by a means which will yieldingly sustain slugs of various thicknesses, so that the end slug which is always under the shoulder 129 will be ejected from the galley in exclusion of all others. Such means consists preferably of a plurality of flexible or depressible supports 135—136—137 pivoted on a rod or support 138 and arranged as shown in Figs. 12 to 14, flush with the bottom of the galley 83, and at the outer extremity of the latter so that as the types or slugs are pushed forward by the belt or band 84 the end ones will be supported by these supports, 135—136—137, and held against downward movement until struck and depressed by the ejecting plunger 130. These supports 135—136—137 are graduated in length and arranged in pairs with the ones constituting the longest pair, 135, arranged at the outer sides of the others, and the ones of intermediate length arranged between the other two pairs in such a manner that the outermost one of the slugs, if it be a single line slug, as appears in Fig. 12, will rest upon the outer pair of supports 135 only; and consequently when such slug is depressed by the plunger it will be ejected from the galley without depressing either of the other slugs upon the supports 136—137 and as soon as it slips off the supports 135 the latter are returned to their former elevated position by any suitable means, such as springs 139 secured to projections 140 on the lower ends of the supports 135 and to a suitable bracket 141, each of the other supports 136—137 being likewise provided with downward extensions 142—143 connected by coil springs 139 for returning them to their elevated position after they are depressed, and in a manner similar to the supports 135. The end of the ejecting plunger 130 contiguous to the galley 83, it will be seen, is struck on the arc of a circle, concentric with the center of oscillation of said ejector and such end is of considerable vertical extent so that it will serve as a means of arresting the advance of the slugs in the galley 83 while the plunger is descending and ascending, and until the shoulder 129 thereof rises to a position above the upper edges of the slugs, whereupon the tape or belt 84 will at once advance another slug to a position against lip 128 and under shoulder 129 in readiness to be ejected like its predecessor, and in order that the upward stroke of the ejector may not cause vertical displacement of the end slug bearing against the circular face thereof, the top of the galley 83 is provided with a cross bar 144, which is arranged very close to the line of the arc described by the plunger or ejector without being under the shoulder 129 and which has that edge which is removed from the plunger beveled or turned upwardly as shown in Fig. 12, so that in case any of the slugs should be slightly elevated above the others it will serve as a guide for pushing them downwardly in proper position under the shoulder 129 and avoid the possibility of arriving at the ejector in a position too high to be engaged by said shoulder.

With the construction described, it will be seen that the end slug, whether it be a slug of maximum or of minimum thickness, will be engaged and ejected by the ejecting shoulder 129, but the remaining slugs back of this one will not be molested by the plunger because they are supported upon the remaining ones of the supports 135—136—
137, inasmuch as no single pair of these supports is wide enough to sustain two slugs at one time. Hence, even though the outer supports 135 may be slightly wider than a slug of minimum thickness, the next slug behind the outermost one on said supports 135 will be sustained by the next support 136, while the end slug is being ejected, and in order that the slug of two line thickness, one of which is shown in the second place in Fig. 12, may not also depress one of the inner supports, which are depended upon for the support of the next inner slug, the outer supports 135—136, have a combined width which is less than the combined width of a single line slug and a double line slug, so that if the double line slug should be outermost, ready to be ejected, it will push downwardly the two outer supports 135—136, leaving the other support 137 intact with the single line slug resting thereon, and, according to the same principle, the three supports have a combined width which is less than the combined width of a three line slug and a slug of a less number of lines.

Ordinarily three lines are adequate for any address, and consequently but three supports 135—136—137, are shown, but it will nevertheless be understood that that number may be multiplied indefinitely or decreased, as occasion requires, it being simply necessary in such instances to have the construction and arrangement such that if one support only is depressed it will be depressed by a slug of minimum thickness, and if two supports are depressed it will be occasioned by a slug of two lines, or intermediate thickness, and such thickness is so proportioned with relation to the combined widths of said two supports as to prevent the next inner slug from resting wholly upon either of the two supports that are capable of being depressed by the two line slug, and the combined width of all of the supports should be such that when they are all depressed by a slug of maximum thickness, or a three line slug, no other slug will be resting wholly upon any of the supports. As the slug is ejected by the plunger 130 it falls lower edge downward into an inclined chute 145 down which it slides by gravity into the jaws 75— 78 of the slug carrier or drum 50, which is revolved at such a rate of speed as to have one of the teeth directly opposite the end of chute 145 as the slug comes down, and when in this position the tooth or jaw 75 is also inclined, as shown in Fig. 10, so that the slug slides to its proper seat on tooth 75 by gravity. In passing from the chute 145 to its place upon the tooth 75, however, it is sustained and guided by one or more tongues 146—147, preferably two, which are pivoted in the bottom of the chute 145 and project outwardly into slots 148—149 in the teeth or jaws 75 (see Figs. 10 and 11) so as not to interfere with the rotation of the slug carrier while at the same time constituting a bridge for conducting the slug safely across the space between the end of the teeth 75 and that of the chute 145, and performing the further useful and probably principal function of supporting the slug above and in readiness to be received by the jaw 75 while the latter is rising into position to lift the slug from the tongues 146—147, during the further rotation of the slug carrier, the slug, of course, being held from slipping downwardly off the tongues 146—147, by engaging with the periphery of the drum 50.

The tongues 146—147 may be supported on a pivot 148, so that if anything should cause a retrograde rotation of the drum 50 while the slugs are seated on the teeth 75, the tongues 146—147, would be flexed downwardly to permit the slugs to pass without damage, the tongues being held normally in their projected position, each by a suitable spring 149, and the bottom of the chute 145 being slotted to permit the upper ends of the tongues to rise should their lower ends be thus depressed.

It is desirable that all of the slugs be deposited in the slug carrier or wheel in the same position with relation to the slug holding jaw, but it is not feasible to have the jaw constructed accurately to the proportions of the slug for various reasons, chief among which are that the slugs themselves vary widely in thickness and the wide slugs would not always fall into the same jaw; and although the length of the slugs is substantially the same for all, they could not be deposited rapidly in a jaw accurately proportioned to their length. Consequently it is desirable to have the jaws for the slugs open at the ends, as better shown in Figs. 10 and 11, so that they will simply rest upon the fixed jaw 75, upon which they are free to fall without obstruction, and after being positioned upon such fixed jaw are clamped, the thick and thin alike, by the elastically actuated moving jaw 78. They are thus positioned on the fixed jaw 75 before the movable jaw 78 clamps them, by a deflector 150 arranged at one side of the drum 50 contiguous to the line of movement of the ends of the slugs after they lodge upon the fixed jaws 75 in such a way that the end of the slug, if it is not in proper position on jaw 75, will brush against the deflector 150, which may be of elastic material, and will be thereby pushed away from the deflector 150 and accurately against a flange 151 formed like an enlarged circular hub on the arms 77 and of such proportion as to project beyond the periphery of the drum and partially overlap the tooth 75, so that when the jaw 78 is open a portion of this flange 151 will serve as a stop for limiting the end thrust of the slug resulting from engagement with deflector 150, and when jaw 78 is closed another part of the flange will be against the end of the slug, as shown in the top position in Fig. 10.

The slugs are thus carried slowly around with the drum 50 and in the direction of movement of the paper as the latter travels between the two sets of tapes or belts 44—48 and as they successively arrive at a position under the stamper 51 the latter descends into contact with the paper, as above described, and produces the impression from the slug thereunder, the stamper turning on its pivot 52 in a direction of movement of the paper to accommodate the sliding movement of the drum which takes place while the stamper is performing its impression operation. It is evident, however, that since the drum travels slowly and the paper, while between the tapes and otherwise unrestrained, travels at a high rate of speed, which is desirable for getting the paper to and from the point where the impression is made with as little delay as possible, the paper must be arrested momentarily, or at least retarded, so that it cannot travel greater than the rate of rotation of the drum 50 and inasmuch as the tapes or belts 44—48 produce different degrees of friction on the ends of the paper, and for other causes, the paper is liable to be out of true with one edge in advance of the other when it arrives under the stamper 51, and consequently, in addition to being retarded or stopped while the impression is being made, it is desirable to provide means for positioning it or truing it up under the stamper. The means for accomplishing these two objects may be one and the same, and consists preferably of one or more gages or stops 152—153 supported on rocker arms 154—155, respectively, which are in turn secured to a rocker shaft 156 extending across the machine and having its end provided with an arm 157 (see Fig. 8) so formed as to elevate the gages 152—153, and hold them elevated from the time that the stamper 51 rises until the paper has entirely cleared the gages, when the latter again descend in readiness to arrest the next paper. A cam 158 is mounted upon and driven by the shaft 67, which, as before explained, also rotates the tape or belt roller 41. These gages 152—153 are also preferably made adjustable lengthwise of the line of movement of the paper so that the point at which the address is printed on the paper may be varied if desired, and to this end the rocker arms 154—155 of the gages are slidably mounted in collars 159 fixed on the shaft 156 and provided with suitable set screws 160 which bind the arms 154—155 in place.

The forward edge of the paper just before it comes against the gages 152—153, is guided above and below by flaring guide plates 161—162 between which the tapes or belts 44—48 pass with the paper, thus avoiding the possibility of the paper being worked past the stops or gages, which descend upon the lower one of the plates 162 through suitable slots or apertures 163 in the upper plate 161.

When the paper leaves the stops or gages 152—153 it is carried downwardly past the roller 41 by that portion of the belt or tape 44 which travels around the idler 42 and by one end of the belts or tapes 48 which travel around an idler 164 arranged below the roller 45 and in front of the roller 41, and delivered upon a suitable rack 165 from where it is conducted into a suitable receiver or receptacle 166, and pushed forward and packed by suitable fingers or arms 167, which latter are secured to a rock shaft 168. This rock shaft 168 is rocked by means of a rod 169 one end of which is secured to an arm 170 on the shaft 168 and the other end being connected to a cam 171 on the shaft 67, as more specifically set forth in a separate application.

As the papers are deposited in the receiver or receptacle 166, suitable markers for separating one batch of papers from another, as, for example, where it is desirable to indicate in the addressed papers where the papers which go to one town leave off and those which go to another town begin, are inserted between the papers by automatic mechanism operating in harmony with the printing mechanism, but to finish the explanation of the instrumentalities which act upon the slug and prepare the slug carrier or drum 50 for receiving it preparatory to printing the address upon the papers, it will be seen that each of the movable jaws 78 is provided on its flange 151 with a lug 172 projecting laterally therefrom and in such a position that as the drum 50 revolves such lug comes into engagement with a trip 173 (see Fig. 4), and thereby turns the movable jaw on its pivot and throws it open, but it is held open, as before described, by the spring 79 until after it passes the chute 145 and receives a slug, and the latter being properly positioned by the deflector 150 as the drum continues to rotate. In its open position the jaw 78 will enter a suitable recess 50ª in the periphery of the slug carrier or drum 50. A second lug 174 also projects laterally from the flange 151 and comes into engagement with a trip 175 secured to a supporting arm 176 (see Fig. 10) which is supported loosely upon the drum shaft 49 at one end and by a spring 177 sleeved on a rod 178 secured at its upper end to arm 176 but passing loosely through it, and at its lower end to a lug 179 through which it loosely passes and carries at the under side of the lug, a thumb nut 180, whereby the position of the trip lug 175, may be adjusted, and should the machine be rotated backward the lug 175 would yield by virtue of spring 177, without damage to the parts. It will be seen that as soon as the lug 174 strikes trip 175, the movable jaw 78 will be closed and the spring 79 will carry the lug 174 out of line with the trip 175, thus permitting the lug 175 to pass said trip.

When the jaws are thrown open by the trip 173, ordinarily the slugs will fall out of their seats in the slug carrier, but it sometimes happens that through the presence of printer's ink or other adhesive substance on the slug, it sticks to its seat and does not fall away from the slug carrier with sufficient promptness. To provide against this contingency, the slug carrier drum is provided in its periphery with a groove 176 which is formed in a line with the slots 149 in the teeth or jaws 75 (see Figs. 1-4 and 5) and in this groove is embedded a stripping band or wire 177, whose ends are brought together at a point slightly beyond that at which the jaw opening trip 173 is located and secured to a support 178, the band or wire being below the inner or lower edge of the slugs when they are in position in the jaws, but at the point where the jaws are opened, it will be observed that one branch of the band or wire extends at a tangent to the periphery of the drum, and consequently, after the jaws are opened the lug will be stripped out of its seat on the drum by such tangent end should it fail to promptly drop out by gravity. Inasmuch, however, as the trip 173 opens a jaw containing a thick slug later than it does one containing a thin slug, owing to the difference in position of the lug 172, a thick slug begins to bear upon the tangent end of the stripping wire with considerable force before the jaw is opened, and to provide against possible injury to the stripping band from this source an end of the band, preferably the lower end, is formed with an elastic medium 179 produced by coiling the wire, or other suitable means. In order, however, that the stripping band or wire 177 may not interfere with or engage the pins 78, of the movable jaws the length of said pins is such as not to extend across the groove 176, and slots 149, as better shown in Fig. 11.

The jaws or slug clamps are thrown open by the trip 173 and the slugs ejected when they arrive at a position substantially over the slug receiver, shown more clearly in Figs. 6 and 7, which contains an incline or chute 180 supported under the point where the slug falls in any suitable way, as by means of a block 181 and curved downwardly toward the bottom of a receiving galley or race 182 having two slots or recesses 183 formed therein for the reception and accommodation of a pair of pivoted members 184 secured to and supported by a rocker shaft 185 which is provided at its outer end with a crank 186 connected to an anchored spring 187 serving to return the members 184 to their normal horizontal position, the upward movement of said members being limited by any suitable stop 188.

The free end of the depressible members 184 are provided with inclines 189 extending upwardly from the bottom of the race or galley 182 and preferably curved on a down curve and the opposite sides or edges of these inclined ends are preferably struck on an arc of a circle 190 from the center 185. When the type or slug falls from the slug carrier 50 it descends head first, that is, with the printing surface down upon the incline 180 and by reason of the force of gravity slides to the bottom of the race or galley 182, crosswise of members 184, with the head or printing surface resting adjacent the inclines 189. At this instant the slug is engaged at the lower or left hand edge, as seen in Fig. 7, and pushed over the upwardly extending inclines 189 by any suitable means, such as a bifurcated plunger 191 connected by a link 192 to the rocker shaft 168 by any suitable means, such as a pivoted lever 193, and a crank arm 194 to which said lever is connected by a link 195 so that the plunger 191 will be reciprocated once for each impression in concert with the printing mechanism. The bifurcations or forks 196 of said plunger 191 fit on opposite sides of the block 181 in the galley 182 and at both sides of the chute or incline 180 in such a manner that when the plunger is pushed forward the forks or bifurcations 196 will engage the lower edge of the slug and push it along the members 184, which, by virtue of their inclines 189, will raise the head or advance edge of the slug in the manner shown in dotted lines in Fig. 7, thus bringing the slug into an upright position with its head resting against its predecessor's in the galley 182 and with its foot or lower edge against the bottom of the galley 182 and the inclines 189. Hence the continued forward movement of the forks 196 will carry the lower edge of the slug still farther along the bottom of the galley 182 and in doing so depress the incline ends 189 of the members 184 completely below the surface of the bottom of the galley, permitting the lower edge of the slug to pass over the upper ends of the inclines 189 and on to the side of the curves 190, and when the after edge of the slug arrives at a tangent to said curve 190, the spring 187 instantly returns the members 184 to their elevated position, as shown in full lines in Fig. 7, for holding the slug thus pushed beyond them from falling toward the left and keeping it in place against its predecessors in the galley 182, the whole line of slugs in the galley being advanced by the plunger 191 in pushing the last slug over the inclines 189, which are located within the two lines of movement of the forks 196, as shown in Fig. 6, so that said forks will pass them in pushing the slugs into place.
In order that the inclines 189 in acting upon the slug may be eventually depressed by the lower end of the slug as it is pushed home in the galley 182 by the forks 196, a suitable flange 197 is secured to or formed on each side of the galley 182 just above the inclines 189 for arresting the upward movement of the slug when it arrives at a substantially upright position and thereby compelling its further movement to take place in a lateral direction. Suitable shields or guides 198 are arranged at both sides of the chute or incline 180 to insure against the slug missing said incline when falling.

The outer end of the race or galley 182, for any desired extent of its length, may be composed of two telescopic sections, one of which is removable, in any suitable manner that will provide for the slugs which are pushed or advanced by the plunger 191 being pushed into the removable section so that such removable section may be left out when desired and a duplicate thereof inserted in its place. One way of accomplishing this is to make the outer end of the race 182 hollow, so that a removable galley section shown at 199 (Figs. 4 and 9) may be inserted into the hollow section, it being understood that by hollow section is meant that the walls and the bottom of the galley 182 throughout the length of the removable section 199 are formed with a space, the same in cross section as the cross section of said section 199. Thus it will be seen that the slugs may be pushed forward by the plunger 191 throughout the entire length of the galley 182, including its hollow end, the floor or bottom of which latter is, of course, flush with the latter of the remainder of the galley 182, and when it is desired to remove the slugs from the galley 182 it is simply necessary to insert the removable section 199 in the hollow end of the galley, and when holding the finger between the slugs at the point where the inner end of the galley 199 terminates, all of the slugs outward beyond the finger and the galley 199 will be pushed out of galley 182 and into the removable section 199, which may be set aside for further use with the slugs in their proper order or arrangement or may be again inserted into the upper galley 83.

The means for depositing the markers between the addressed papers for separating one batch from another for the purposes before explained will now be described.

As an example of such markers there is shown a number of slats 200 each in the form of a thin strip of wood or other suitable material, which may be of sufficient length to extend entirely across the receiver 166, as shown in Figs. 3 and 5, and of sufficient length to be supported by the sides of said receiving trough when they are released and allowed to fall, the sides of the trough being lower than the upper edges of the addressed papers contained therein, which are shown at 201 and consequently the marker or slat

200, when deposited on the edges of the trough as shown in Figs. 1 and 4, will serve to separate one batch of papers from another and will extend beyond both sides of the column of papers so that the operator may readily determine where the towns of different batches begin and terminate. These slats or markers 200 are held at their ends in a vertical column, one upon the other flat wise by suitable retainers or guides 202 in the form of vertically arranged channel bars and the lowermost one of the markers 200 is ejected from these retainers automatically by any suitable mechanism operating in harmony with the printing mechanism, for example, the lower end of each guide 202 is provided preferably at the inner side with a slot 203 in its side wall, (Figs. 4 and 21) of sufficient height to permit the lowermost marker 200 to be pushed out laterally without laterally displacing those above it, by means of ejectors 204 supported and guided transversely in the lower end of the retainers 202 in such a way that when these ejectors are pulled inwardly a plunger 205 on each of the ejectors will engage the outer edge of the lowermost one of the slats 200, and push it through the slots 203 in the inner sides of the retainers 202, those above the one ejected falling upon the top of the plunger 205 for the time being and eventually dropping to the bottom of the retainer 202 with the lower one opposite the slot 203 when the plunger 205 returns to its other position, as shown in Fig. 4. These ejectors 204 are connected to bell crank levers 206 which latter are supported on and secured to a rocker shaft 207 and one arm of the bell crank of one of the levers 206, is pivoted to the upper end of a link 208 whose lower end is hinged or pivoted at 209 to a rod 210 on an axis at right angles to the pivot of the upper end of the link 208 so that the lower end of the rod 210 will be capable of swinging toward and from a lug 211 which operates continuously, making a downward stroke at each impression of the printing mechanism, so that at certain times a hook or companion lug 212 on the lower end of the rod 210 may be thrown into the line of movement of the lug 211 and thereby impart a rocking movement to the shaft 207 and consequently actuate the ejectors 204 to force out one of the markers 200. This lug 211 is secured to the rod 169 which receives its endwise motion from the cam 171, in the manner already set forth.

When it becomes necessary to deposit one of the markers 200 between the papers the deflectable rod 210 is forced outwardly into the line of movement of the lug 211 by the lower end 212ª of a lever 213 which is pivoted at 214 and has its upper end curved concentric with the wheel or drum 50 and provided with a thin curved shoe 215 which engages against the outer ends of the slugs 76 as they rest in the slug clamps or jaws 75—78.

The lower end of the lever 213 is strained continually toward the deflectable bar 210 by suitable means such as a spring 216 pulling outwardly on such lower end, and consequently the shoe 215 is held gently against the ends of the slugs as the slug carrier rotates, and such slugs therefore, serve to hold the end 212ª of the lever away from the deflectable rod 210, permitting gravity to keep the hook 212 out of line with the lug 211, the hook 212 being provided with a fork or guide 217 embracing the rod 169 for preventing the bar 210 from being deflected sidewise when the lug 211 and hook 212 are out of engagement; but the end of each of the teeth or fixed jaws 75 is provided with a groove 218 concentric with the drum or wheel 50 and in line with and adapted to receive the shoe 215, so that by providing some of the slugs with notches or grooves in their outer ends, as shown at 219 in Fig. 19, for example, the spring 216 will serve to throw the disengageable members 211—212 into engagement each time such a notched slug passes the shoe 215, and consequently at such time the ejectors 204 will be actuated and a marker 200 dropped between the papers in the receiver 166, the disengageable members 211—212 are both beveled or hook shaped so as to insure against accidental disengagement.

The shoe 215 is of such a length that while it spans two of the teeth 75, and thus avoids vibration of the lever 213 when the unnotched slugs are passing it, it is too short to reach across three of the teeth or slugs, and consequently, if either of the three be notched it will recede into such notch but will be pushed outwardly again as soon as the next unnotched slug reaches it. As soon as the lug 211 rises the ejectors 204 are returned to their former outward position, as shown in Figs. 1 and 17, by a suitable means, such as a spring 220, which also serves to lift the bar 210 and hook 212 in readiness to be again depressed at the proper time by the lug 211, thus throwing down another one of the markers 200. When the marker falls upon the sides of the receiver 166, it may be held in a forward position and from receding with the fingers 167 by shoulders 221 on the sides of the receiver 166. It will, of course, be understood that the notched slug shown in Fig. 19, is the one which bears the first name and address of papers going to a certain town, or any other matter to be printed on the first one of a certain batch of papers, or if desired, upon the last one of such papers and the shoe 215 is so positioned with relation to the point at which such slug produces its impression upon the paper that the paper thus printed will arrive at its position in the receiver 166 for the addressed papers by the time the notched slug reaches shoe 215, and the latter falls into the notch for actuating the marker ejecting mechanism.

In Figs. 25 and 26 of the drawings, is shown a modification of the means for storing the slugs in the storing slug receiving galley after they have been printed from. In this form the plunger 191 connected and operating as before described is formed with a single head or end 222 and is so arranged in the race or galley 182 that when the slug 76 drops as shown in Fig. 26, it will first fall head first onto a ledge 223 arranged directly under the slug carrier 50 and the point where the jaws 78 open, and will then tumble over the edge of the ledge 223 foot or lower end downward and fall immediately in front of the plunger head 222 between two springs 224, which hold it long enough for the plunger to push it forward behind two shoulders 225 formed on the inner sides of said springs, where it is then supported on edge at one side by its predecessors in the galley 182 and on the other side by the shoulders 225. The ledge 223 is provided at its sides with walls 226—227, the outer and latter one of which is lower than the other one so that the slug when it falls upon the ledge cannot tumble backward but must fall over the ledge 227.

With the galleys 83—182 arranged as shown in Fig. 1 of the drawings it will be understood that while the slugs will be returned to the galley 182 and stored therein in their same relative order or arrangement with relation to each other, the one first to print when the slugs went through the machine the first time will be the last to print when they go through the machine the second time because of the fact that it is the first to enter the removable galley section 199, but if in any case this reversal of the ends of the sections should be objectionable, the receiving galley 182 and its removable section 199 may be continued in the same direction as the direction of movement of the slugs in the galley 83 and projected outwardly at the right hand end of the machine instead of the left hand, as viewed in Figs. 27 and 28. The parts of the machine in this latter figure bear the same numbers as the corresponding parts in Fig. 1, the construction and operation being the same, the direction only which the galley 182 extends from the machine being different, excepting that the galley 182 as shown in Fig. 27, is provided with a bend or offset 228 to avoid the receiver 166 and the side of the galley 182 is provided with a slot 229 where a pin 230, which connects link 231 to the plunger 191, passes through, the link 231 in this instance being bent down as shown in Fig. 28, to avoid the upper parts.

The modern linotype machine casts single line slugs only, but to produce the multiline slugs before described a number of such single line slugs are secured together.

In order that the invention might be fully understood, the details of an embodiment thereof have been thus specifically described, but

What I claim is:—

1. In an addressing machine, the combination of a rotary type carrier, means for conveying the papers in proximity to the type, means for moving the type and paper along together and an oscillatory stamper for pressing the paper against the type, also movable back and forth in the line of movement of the type.

2. In an addressing machine, the combination of a rotary printing surface, means for moving the paper and printing surface along together, a pivoted stamper, means for causing the stamper to engage the paper for pressing the same against the printing surface, said stamper being provided with a curved face struck from its pivot, whereby said stamper will follow the line of the movement of the printing surface, and means for moving the stamper in the opposite direction about its pivot for returning the stamper to its normal position.

3. In an addressing machine, the combination of a printing surface, means for moving the paper and the printing surface along together, an oscillatory stamper for pressing the paper against the printing surface, movable back and forth in the line of movement of the printing surface, said stamper being adapted to be moved in one direction by frictional contact with the paper, and a spring for returning said stamper in the opposite direction when it releases the paper.

4. In an addressing machine, the combination of periodically operating means for applying the address to the paper, means for conveying the papers past the first said means, a stationary paper guide into which the paper passes, a stop coöperating with the guide for positioning the papers, means for adjusting the stop lengthwise of the line of movement of the paper and with relation to said first means to accommodate papers of different sizes, and means for operating said stop in any of its adjusted positions in concert with the address-applying means for releasing the papers after the address is applied to permit the paper to further advance.

5. In an addressing machine, the combination of periodically operating means for applying the address to the paper, conveying tapes for carrying the paper past said first means, slotted guides above and below said tapes for the paper, a stop adjustable lengthwise of the line of movement of the paper and projecting through said slot for engaging the paper and positioning it with relation to the address-applying means, and means operating in concert with said address-applying means for releasing the stop from the paper after the paper has been properly positioned.

6. In an addressing machine, the combination of means for applying the address to the papers, a receiver for the addressed papers, means for retaining a supply of markers for separating one batch of papers from another, and means operatively connected with said address-applying means operating intermittently and adapted to successively engage said markers for periodically casting one of said markers between the papers in said receiver at predetermined intervals, the last recited means engaging the marker at the discharge end of the marker holder.

7. In an addressing machine, the combination of means for applying the addresses to the papers, a receiver for the addressed papers, means for retaining a supply of markers for separating one batch of papers from another, means operatively connected with said address-applying means for periodically releasing one of said markers to permit the same to assume a position between the papers, and means for holding the markers in position and against receding movement.

8. In an addressing machine, the combination of means for applying the addresses to the papers, a receiver for the addressed papers, including side walls, means for retaining a supply of markers for separating one batch of papers from another, means operatively connected with said address-applying means for periodically releasing one of said markers to permit the same to assume a position between the papers, said markers being of a length to engage the side walls of the receiver, and shoulders on said walls adapted to be engaged by the markers to prevent displacement of the same.

9. In an addressing machine, the combination of means for applying the address to the papers, a receiver for the addressed papers, means for retaining a supply of markers for separating one batch of papers from another, means for ejecting said markers one at a time into the receiver, means acting in concert with said address-applying means for operating said ejector, comprising two disengageable members, and means operatively related to said address-applying means for periodically throwing said members into engagement with each other.

10. In an addressing machine, the combination of means for applying the address to the papers, comprising means for holding a series of grooved and ungrooved slugs, a receiver for the addressed papers, means for retaining a supply of markers for separating one batch of papers from another, means for ejecting said markers one at a time between the addressed papers, means operatively connecting said ejecting means with the said address-applying means comprising a detachable connection, and a deflectable member arranged in the line of the grooves of said slugs for operating said detachable connection.

11. In an addressing machine, the combination of means for applying the address to the papers comprising means for holding a series of grooved and ungrooved slugs, a receiver for the addressed papers, means for retaining a supply of markers for separating one batch of papers from another, means for ejecting said markers one at a time between the addressed papers, means operatively connecting said ejecting means with said address-applying means, comprising two detachable members and a pivoted lever having one end arranged in the line of the grooves of said slugs and the other end arranged to engage one of said members and throw it into connection with the other.

12. In an addressing machine, the combination of means for applying the address to the papers, comprising a rotary slug carrier having a series of slug holders provided with grooves and adapted to retain grooved and ungrooved slugs, a receiver for the addressed papers, means for retaining a supply of markers for separating one batch of papers from another, means for ejecting said markers one at a time between the addressed papers, means operatively connecting said ejecting means with said address-applying means, comprising two disengageable members, a pivoted lever having one end running in the grooves in said slug holders and the other end operatively related to said disengageable members for relatively moving them as the grooved and ungrooved slugs pass and engage said lever.

13. In an addressing machine, the combination of means for applying the address to the papers, a receiver for the addressed papers, two upright guides or retainers for holding a stack of marker slats, said retainers having openings at their ends for permitting said slats to be ejected laterally, ejecting means movable transversely of such retainers for ejecting said slats one at a time between the addressed papers, a detachable connection between said address-applying means and ejector, and means operatively related to the address-applying means for periodically rendering said connections operative.

14. In an addressing machine, the combination of a rotary slug carrier comprising a series of slug clamps, each consisting of a fixed and a pivoted jaw, a spring attached to each of said pivoted jaws for rotating it in either direction beyond the center of its pivot so as to cause it to remain open or closed, two lugs on each of said jaws arranged out of line for respectively opening and closing them, and two trips arranged in line with said lugs respectively and adapted to engage therewith.

15. In an addressing machine, the combination of a galley, means for urging the slugs forward in said galley, a yielding support comprising a plurality of sections for receiving and sustaining the end slugs in the galley, means for ejecting each slug against the resistance of said support and means for receiving the ejected slug and producing an impression therefrom.

16. In an addressing machine, the combination of a galley, means for urging the slugs forward in the galley, means for yieldingly supporting the end slug in the galley, means coöperating with the supporting means for yieldingly gripping such slug while thus sustained to prevent it from toppling over, means for ejecting the slug against the resistance of said gripping means, and means for receiving the ejected slug and producing an impression therefrom.

17. In an addressing machine, the combination of a galley, means for urging the slugs forward in the galley, yielding means for sustaining the end slug in the galley, an ejector movable transversely of the galley for ejecting the slug toward and against the resistance of said sustaining means, and means for receiving the ejected slug and producing an impression therefrom.

18. In an addressing machine, the combination of a galley, means for urging the slugs forward in said galley, means for sustaining the end slug in the galley movable out of the way of said slug, a side friction device adapted to engage the ends of the slugs, a rock shaft, and means carried thereby and operating adjacent the end of the galley for ejecting the end slug against the action of the said sustaining means.

19. In an addressing machine, the combination of a galley, means for urging the slugs forward in the galley, a series of disengageable devices for sustaining a plurality of the foremost slugs in the galley, means for ejecting the end slug against the resistance of said sustaining means, and means for receiving the ejected slug and producing an impression therefrom.

20. In an addressing machine, the combination of a galley, means for urging the slugs forward in the galley, a series of yielding supports for the slugs arranged one in advance of the other in the direction of movement of the slugs in the galley for sustaining a plurality of said slugs, the sum of the widths of said supports being less than the width of the slugs of maximum thickness, means for ejecting the slugs from the galley toward said supports, and means for receiving the ejected slug and producing an impression therefrom.

21. In an addressing machine, the combination of a galley, means for urging the slugs forward in the galley, a plurality of deflectable supports arranged in the bottom of the galley for yieldingly supporting the slugs, the outermost one of said supports being less in width than the width of two slugs, and a plurality of said supports counting from the outer end of the series being of a width less than the width of the maximum sized slug, means for ejecting the outermost slug against the action of said supports, and means for receiving the ejected slug and producing an impression therefrom.

22. In an addressing machine, the combination of a galley, means for urging the slugs forward therein, means for yieldingly sustaining the end slug in the galley, a top guide arranged over the slugs near the end of the galley, an ejector for engaging the end slug adjacent to said guide, and means for receiving the ejected slug and producing an impression therefrom.

23. In an addressing machine, the combination of a galley, means for urging the slugs forward in the galley, means for yieldingly sustaining the end slug in the galley from the lower edge, a downwardly acting ejector arranged to engage the end slug and eject it against the action of said sustaining means, a chute arranged under said ejector, and means for receiving the slug from said chute and producing an impression therefrom.

24. In an addressing machine, the combination of a galley, means for urging the slugs forward in the galley, means for yieldingly sustaining the end slug in the galley, an ejector having a lip adapted to come against the side of the slug and a shoulder adapted to come against the edge of the slug, for ejecting the slug against the action of said sustaining means, and means for receiving the ejected slug and producing an impression therefrom.

25. In an addressing machine, the combination of a galley, means for urging the slugs forward in the galley, means for ejecting the end slug from the galley, means for sustaining the end slug in the galley yieldingly against the action of the ejecting means, said ejecting means having a sustaining lip adapted to come against the side of the slug and a shoulder adapted to come against the edge of the slug, and means arranged adjacent to said shoulder and across the line of movement of the slugs in the galley for preventing the end slug in the galley from moving outwardly in the direction of the return movement of the ejector.

26. In an addressing machine, the combination of a galley, means for urging the slugs forward therein, a top guide on said galley near the end thereof, inclined or beveled on its inner side adjacent to the slugs, yielding means for sustaining the slugs in the galley below said guide, an ejector movable against the end slug contiguous to said guide for removing the end slug against the action of said sustaining means, and means for receiving the ejected slug and producing an impression therefrom.

27. In an addressing machine, the combination of a rotary slug carrier embodying spaced seats for the slugs, a slug ejecting band encircling said carrier below the seats of the slugs therein so as to eject said slugs as the carrier rotates, and means for producing impressions from said slugs while in said carrier.

28. In an addressing machine, the combination of a rotary slug carrier, a slug ejecting band encircling said carrier below the seats of the slugs therein so as to eject said slugs as the carrier rotates, said band having an elastic portion adjacent one end, and means for producing impressions from said slugs while in said carrier.

29. In an addressing machine, the combination of a rotary slug carrier having slug clamps, and a peripheral groove in the bottoms of said clamps, an ejecting band embedded in said grooves so as to be below the slugs on one side of the carrier, but carried outwardly at a tangent to the carrier on the other side so as to eject the slugs as the carrier rotates, and means for producing impressions from the slugs while in the carrier.

30. In an addressing machine, the combination of a rotary slug carrier, means for producing impressions from the slugs in said carrier, a receiving galley for the slugs as they come from said carrier, retaining springs on opposite sides of said galley having slug-supporting shoulders arranged at less distance apart than the length of the slugs, and a reciprocating plunger for forcing the slugs past said supporting shoulders.

31. In an addressing machine, the combination of means for holding a supply of slugs or types, means for ejecting said slugs or types from said holding means singly in a direction lengthwise of the plane of the body portion of the type, and means for yieldingly sustaining a plurality of said slugs or types independently of each other.

32. In an addressing machine, the combination of means for holding a supply of slugs or types, a chute into which said slugs are adapted to fall, a series of moving slug clamps for receiving the slugs from said chute, having one or more slots, and fingers projecting from said chute into said slots for directing the slugs into said clamps.

33. In an addressing machine, the combination of means for holding a supply of slugs, a chute for receiving the slugs from said means, a series of moving slug clamps for holding the slugs while being printed from having one or more slots, and one or more flexible fingers projecting from said chute and arranged to engage in said slots for directing the slugs into said clamps.

34. In an addressing machine, the combination of means for holding a supply of slugs, a moving series of slug holders, means for advancing said slugs from said supply into said holders and a yieldable slug adjuster separate from and arranged adjacent to the line of movement of said holders for engaging and adjusting the slugs therein.

35. In an addressing machine, the combination of means for holding a supply of slugs, a moving series of slug holders, means for depositing the slugs from said supply into said holders, and a flexible slug adjuster arranged adjacent to the line of movement of said holders and adapted to be brushed by the slugs therein for pushing the slugs endwise into position.

36. In an addressing machine, the combination of means for holding a supply of slugs, a series of moving slug holders or clamps each open at one side or end and comprising a flat tooth or jaw and a movable jaw adapted to clamp the slug against said fixed jaw, means for depositing the slugs into said clamps and means arranged adjacent to the open end or side of the clamps for engaging the slug and pushing it endwise in the opposite direction.

37. In an addressing machine, the combination of means for holding a supply of slugs, a moving series of slug clamps or holders, each comprising a fixed jaw, which on one side has no confining means for the end of the slug, means arranged adjacent to that side for engaging the slug and forcing it in the opposite direction, means at the outer side for limiting the movement of the slug received from said forcing means, means for pressing the slug against said fixed jaw and means for depositing the slug in said holders from said supply.

38. In an addressing machine, the combination of a continuously revolving slug holder, means for conducting the paper past the slugs in said holder, acting continuously on the paper to thus advance it, means for momentarily arresting the paper while projecting across one of the slugs in the holder, means for pressing the papers against the slug while thus arrested, and means for moving the last said means back and forth in the direction of movement of the slug holder.

39. In an addressing machine, the combination of a continuously revolving slug holder, means for conducting the papers across said slug holder, a stamper movable downwardly toward the slug holder for pressing the paper toward the slug holder, and means whereby the stamper may be given a movement independent of its downward movement and back and forth in the direction of movement of the slug holder.

40. In an addressing machine, the combination of a continuously revolving slug holder, means for conducting the paper across said slug holder, an arm, a stamper pivotally connected to the arm for pressing the paper toward the slug holder, movable in the direction of movement of the slug holder, and means for rocking the arm to cause the stamper to engage the paper.

41. In an addressing machine, the combination of a revolving series of slug holders, a stripping or ejecting band surrounding said series of holders and adapted to lie under the inner edges of the slugs therein, for forcing the slugs therefrom as the holders revolve, and an elastic medium holding one end of said band for permitting it to yield.

In testimony whereof I have signed my name to this specification, in the presence of two subscribing witnesses, on this 19th day of June, A. D. 1906.

SANDFORD C. COX.

Witnesses:
E. H. SANFORD,
J. TOMLINSON.